United States Patent
Thoma et al.

(10) Patent No.: US 12,088,655 B1
(45) Date of Patent: Sep. 10, 2024

(54) SYSTEMS AND METHODS FOR DETECTING REAL-TIME DELAYS IN ELECTRONIC COMMUNICATIONS OVER COMPUTER NETWORKS IN AN ONGOING MANNER AND IN ENVIRONMENTS IN WHICH USERS HAVE NO ACCESS TO INTERMEDIARY DEVICES USING A PARALLEL PROCESSING STREAM

(71) Applicant: Citibank, N.A., New York, NY (US)

(72) Inventors: Zoltan Thoma, Mississauga (CA); Mohsin Jaffar, New York, NY (US); Jeremy York, New York, NY (US); Anthony Frederick John Warden, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/585,030

(22) Filed: Feb. 22, 2024

(51) Int. Cl.
*H04L 65/80* (2022.01)
*H04L 43/045* (2022.01)
*H04L 43/0852* (2022.01)
*H04L 43/0882* (2022.01)
*H04L 65/61* (2022.01)

(52) U.S. Cl.
CPC ............ *H04L 65/80* (2013.01); *H04L 43/045* (2013.01); *H04L 43/0858* (2013.01); *H04L 43/0882* (2013.01); *H04L 65/61* (2022.05)

(58) Field of Classification Search
CPC ... H04L 65/80; H04L 43/045; H04L 43/0858; H04L 43/0882; H04L 65/61; G06F 9/5072
See application file for complete search history.

(56) References Cited

U.S. PATENT DOCUMENTS

| | | | |
|---|---|---|---|
| 2012/0092991 A1* | 4/2012 | Jeong | H04L 67/04 370/235 |
| 2017/0012861 A1* | 1/2017 | Blumenthal | H04L 45/24 |
| 2022/0182306 A1* | 6/2022 | Soni | H04L 47/32 |
| 2022/0391977 A1* | 12/2022 | Jaffar | G06F 11/327 |

* cited by examiner

*Primary Examiner* — Tonia L Dollinger
*Assistant Examiner* — Mehulkumar J Shah
(74) *Attorney, Agent, or Firm* — Foley & Lardner LLP

(57) ABSTRACT

Systems and methods for improvements for processing electronic communications over computer networks. As one example, systems and methods may ensure real-time (and/or near real-time) processing of electronic communications over computer networks by detecting real-time delays in electronic communications over computer networks in an ongoing manner and in environments in which users have no access to intermediary devices using a parallel processing stream.

20 Claims, 5 Drawing Sheets

200

| Tag | Inbound |
|---|---|
| Msg Type | ATOMIC_FLUSH_LEVEL2 |
| Source Sequence Number | PF1234565 |
| Time Stamp | 12:31:11.11234 |
| Content | #Value |

250

| Tag | Inbound |
|---|---|
| Msg Type | NewOrder |
| Client Order | ABCD1234 |
| Time Stamp | 12:32:10.45433 |
| Content | #Value |

SYSTEMS AND METHODS FOR DETECTING REAL-TIME DELAYS IN ELECTRONIC COMMUNICATIONS OVER COMPUTER NETWORKS IN AN ONGOING MANNER AND IN ENVIRONMENTS IN WHICH USERS HAVE NO ACCESS TO INTERMEDIARY DEVICES USING A PARALLEL PROCESSING STREAM

BACKGROUND

The continuous advancement of technology, including the proliferation of smartphones, tablets, and high-speed internet, has made electronic communication more accessible and convenient. The expansion of reliable and high-speed internet infrastructure globally has likewise facilitated increased use of real-time electronic communication methods. However, this proliferation of electronic communications and the general reliability of real-time electronic communications has created a dependency on this reliability. That is, electronic devices and applications utilizing electronic communications often depend on the real-time processing and receipt of these communications to function properly. This dependence creates a technical problem for applications in ensuring real-time (and/or near real-time) processing.

SUMMARY

Systems and methods are described herein for novel uses and/or improvements for processing electronic communications over computer networks. As one example, systems and methods are described herein for ensuring real-time (and/or near real-time) processing of electronic communications over computer networks by detecting real-time delays in electronic communications over computer networks in an ongoing manner and in environments in which users have no access to intermediary devices using a parallel processing stream.

Ensuring real-time (and/or near real-time) processing of electronic communications over computer networks raises a novel technical problem. For example, in order to ensure that communications are being processed in real time, the system must first detect whether or not a delay exists. However, determining processing speeds (e.g., bandwidth speed over an internet connection) can be challenging due to various factors that can affect the measurement accuracy. For example, the speed of a network can vary based on the amount of traffic it is handling. During peak hours or in congested networks, the available bandwidth may be lower. To test for processing speeds, existing systems download and upload specific data files to and from a user's device. The systems then measure the time taken to complete these transfers to calculate the speed. Unfortunately, networks are dynamic, and the speed can fluctuate based on real-time conditions such that speed tests capture only a snapshot at a specific moment and actual speeds may vary over time. Additionally or alternatively, interference from other electronic devices, physical obstacles, and/or radio frequency interference can affect the reliability of processing speed measurements at any one time. Thus, conventional tests for processing speeds fail to detect real-time delays in an ongoing manner (e.g., are limited to snapshot detections) and may be susceptible to reliability issues related to other device interference.

To further complicate these issues in conventional tests, a novel technical issue arises in that perceived (or effective) processing speeds may be impacted by intermediary devices and/or restrictions on those devices. For example, if the electronic communications are routed through an intermediary device (e.g., a server), the speed at which data is transmitted can be limited by the capabilities of the device involved (e.g., effecting the overall perceived bandwidth). Similarly, the physical distance between a user and the one or more intermediary devices, as well as the routing path taken by the data, can influence perceived speed (e.g., longer distances and/or complex routes may introduce latency and reduce effective bandwidth). Finally, the user may have limited access to the one or more intermediary devices as Internet Service Providers (ISPs), or an entity controlling/providing the intermediary devices, may implement traffic management policies, prevent access to device metrics, perform bandwidth throttling, and/or use quality-of-service measures that can impact the perceived speed for certain types of data.

Accordingly, the systems and methods are described herein for detecting real-time delays in electronic communications over computer networks in an ongoing manner (i.e., not via file download/upload snapshots) and in environments in which users have no access (or limited access) to intermediary devices. The systems and methods accomplish this using a parallel processing stream to detect real-time delays (e.g., as opposed to tests using download/upload of specific data files). For example, to test for processing speed without the need for file download/upload snapshots, the systems and methods generate a parallel processing stream of incoming data. That is, the system mirrors an incoming data stream. This incoming data stream may then be supplemented with additional data (e.g., sequence indicia) used to perform speed tests. Additionally, the system mirrors the incoming data stream prior to the incoming data stream being received by an intermediary device. By doing so, the system not only avoids the technical issues described above due to lack of access to the intermediary devices, but, as an additional technical advantage, the system avoids adding any additional processing load on the intermediary devices (e.g., due to receiving the parallel processing stream, supplementing the incoming data stream to create the parallel processing stream, and/or performing speed calculations on the parallel processing stream).

In some aspects, systems and methods are described for detecting real-time delays in electronic communications over computer networks, using parallel processing streams, in an ongoing manner and with limited access to intermediary devices. For example, the system may receive an incoming data stream, wherein the incoming data stream is destined for an intermediary device, and wherein the incoming data stream comprises time-series data comprising data packets at discrete time intervals. The system may generate a parallel processing stream by mirroring the incoming data stream prior to receipt by the intermediary device and supplementing each of the data packets with a respective sequence indicium corresponding to a respective time interval to generate supplemented data packets. The system may retrieve a first data packet and a second data packet from the supplemented data packets of the parallel processing stream, wherein the first data packet is supplemented with a first sequence indicium, and wherein the second data packet is supplemented with a second sequence indicium. The system may compare the first sequence indicium to the second sequence indicium to determine a processing speed for a first application, wherein the first application is implemented on the intermediary device. The system may generate for display, on a user interface, the processing speed for the first application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
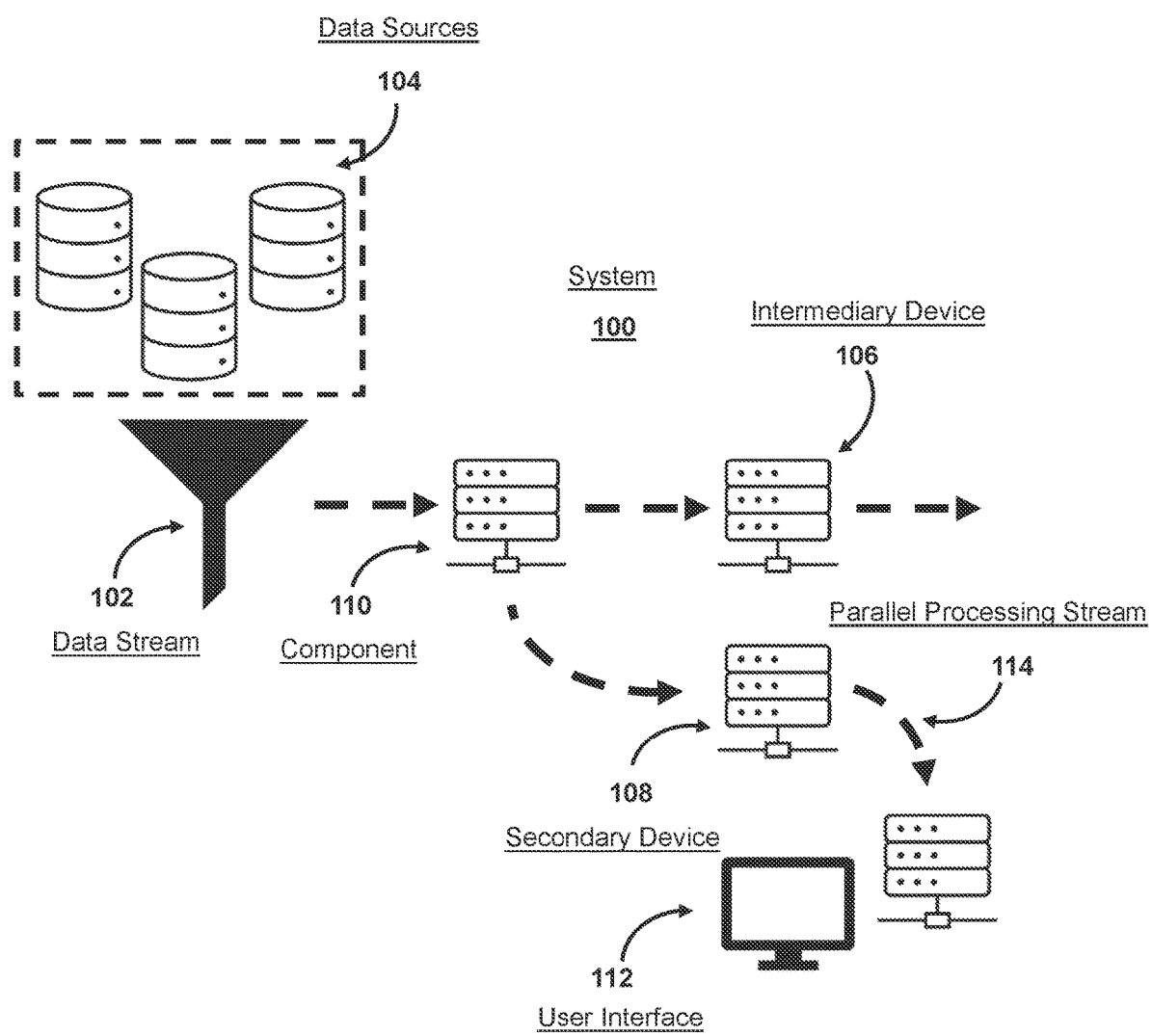
FIG. 1 shows an illustrative diagram for a parallel processing stream, in accordance with one or more embodiments.

FIG. 1 shows an illustrative diagram for a parallel processing stream, in accordance with one or more embodiments. For example, FIG. 1 shows system 100. In some embodiments, system 100 may be used for detecting real-time delays in electronic communications over computer networks, using parallel processing streams, in an on-going manner and with limited access to intermediary devices.

System 100 may receive incoming data stream 102. For example, incoming data stream 102 may comprise time-series data from one or more of data sources 104. Incoming data stream 102 may comprise time-series data comprising data packets at discrete time intervals. As described herein, "time-series data" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time series analysis. For example, a time series analysis may be useful to see how a given asset, security, or economic variable changes over time. It can also be used to examine how the changes associated with the chosen data point compare to shifts in other variables over the same time period. For example, with regards to retail loss, the system may receive time series data for the various subsegments indicating daily values for theft, product returns, etc.

The time-series analysis may determine various trends such as a secular trend, which describes the movement along the term, a seasonal variation, which represents seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data which may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors. The use of a non-parametric bias test alleviates the need for normalization, while still allowing the methods and systems to determine a respective proportion of error detections for each of the plurality of time-series data component models. Through this unconventional arrangement and architecture, the limitations of the conventional systems are overcome. For example, non-parametric bias tests are robust to irregular distributions while providing an allowance for covariate adjustment. Since no distributional assumptions are made, these tests may be applied to data that has been processed under any normalization strategy or not processed under a normalization process at all.

As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment.

For example, in some embodiments, the analysis of time-series data presents comparison challenges that are exacerbated by normalization. For example, a comparison of original data from the same period in each year does not completely remove all seasonal effects. Certain holidays such as Easter and Chinese New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years, but if Easter falls in March, the level of activity can vary greatly for that month for some series. This distorts the original estimates. A comparison of these two months will not reflect the underlying pattern of the data. The comparison also ignores trading day effects. If the two consecutive months of March have different compositions of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may, in some cases, be normalized to account for this issue, the normalization of one data stream segment (e.g., for one component model) may affect another data stream segment (e.g., for another component model). Individual normalizations may distort the relationship and correlations between the data leading to issues and negative performance of a composite data model.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular subsegment (e.g., a component model as described herein) that result in inaccuracies for predictions and/or output based on the subsegment, and/or the errors may occur in models corresponding to an aggregation of multiple subsegments (e.g., a composite model as described herein) that result in inaccuracies for predictions and/or outputs based on errors received in one or more of predictions of the plurality of subsegments and/or an interpretation of the predictions of the plurality of subsegments.

The incoming data stream may be destined for a first application implemented on an intermediary device. An intermediary device in a network is a hardware device that acts as a middleman or mediator to facilitate communication between different devices within a network. These devices play a crucial role in managing and directing data traffic, ensuring that information is transmitted efficiently and securely. These devices may include routers that connect different networks together and determine the best path for data to travel between them. They use routing tables and protocols to make decisions about forwarding data packets. These devices may include switches that operate at the data link layer of the OSI model and are responsible for forwarding data within the same network. They use MAC addresses to make forwarding decisions, improving the efficiency of local network communication. These devices may include proxy servers acting as intermediaries between clients and servers. They can be used for various purposes, such as caching content to improve performance, filtering content for security reasons, or providing anonymity for users. These devices may include servers in a network that are powerful computers or dedicated hardware devices that provide services, resources, or functionality to other computers or devices on the network. These servers are designed to handle specific tasks, manage network resources, and facilitate communication and data sharing among connected devices. Servers play a central role in network architecture and can serve various purposes.

System 100 may also include intermediary device 106. For example, intermediary device 106 may perform one or more processing actions based on information detected in the data packets. For example, intermediary device 106 may comprise an application server that hosts and runs software applications. Intermediary device 106 may provide a runtime environment for applications to execute, manage transactions, and handle business logic.

System 100 may generate a parallel processing stream by mirroring incoming data stream 102 prior to receipt by intermediary device 106 and supplementing each of the data packets with a respective sequence indicium corresponding to a respective time interval to generate supplemented data packets, wherein the parallel processing stream is destined for a second application implemented on a secondary device (e.g., secondary device 108). The secondary device may comprise the same type of hardware and/or software of an intermediary device, but may be distinguished by residing on a different network and/or processing different applications. In some embodiments, the system may mirror the incoming data stream by determining a first network port for the intermediary device and determining a second network port corresponding to the parallel processing stream. For example, the system may determine a first network port for the intermediary device. The system may intercept each of the data packets at the first network port. The system may duplicate each of the data packets at the first network port in real time.

For example, the system may determine the intermediary device in the network where the incoming data stream needs to be mirrored. This could be a network switch, router, or other network device capable of supporting port mirroring. The system may identify the first network port on the intermediary device that is connected to the source of the incoming data stream. This port is where the original data is being received. The system may identify a second network port on the intermediary device to which the mirrored data will be sent. This is the port corresponding to the parallel processing stream. The system may access configuration settings of the intermediary device and set up port mirroring. Port mirroring, also known as SPAN (Switched Port Analyzer) or TAP (Traffic Access Point), allows the device to copy or mirror the traffic from one port to another. The system may configure the port mirroring settings to specify the source port (the first network port receiving the incoming data) and the destination port (the second network port corresponding to the parallel processing stream). The system may then connect the device or system that is responsible for handling the parallel processing stream to the second network port on the intermediary device. This is where the mirrored data will be received for further processing.

System 100 may comprise component 110, which may generate the parallel processing stream (or a data stream that may be used to generate the parallel processing stream). For example, component 110 may comprise a ticker plant. A ticker plant is a specialized system used in financial markets to collect, process, and distribute real-time financial data, especially stock and securities prices. It plays a crucial role in providing up-to-the-moment information to traders, financial institutions, and other market participants. The term "ticker" refers to the rapid scrolling of stock symbols and their corresponding prices (e.g., incoming data stream 102), which may be on a digital display, much like the historical, tape-based ticker machines.

Ticker plants receive data feeds from various financial exchanges (e.g., data sources 104), often in the form of electronic messages. These data feeds contain information about trades, quotes, order book updates, and other relevant market data. Ticker plants may normalize and standardize the incoming data to ensure consistency. Different exchanges may have varying data formats, and normalization helps create a unified format for easier processing.

System 100 may retrieve, by a second application, a first data packet and a second data packet from the supplemented data packets of a parallel processing stream (e.g., parallel processing stream 114) in response to detecting a correlation, based on a processing action performed by the first application (e.g., implemented on intermediary device 106), between a third data packet and a fourth data packet in the incoming data stream, wherein the first data packet is supplemented with a first sequence indicium, and wherein the second data packet is supplemented with a second sequence indicium. System 100 may then compare, by the second application, the first sequence indicium to the second sequence indicium to determine a processing speed for a first application, wherein the first application is implemented on the intermediary device.

The system may then generate for display, on a user interface (e.g., user interface 112), the processing speed for the first application. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

Figure 2:
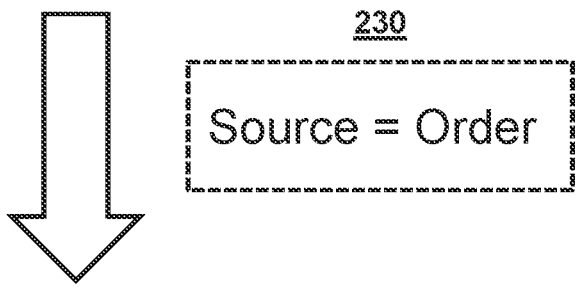
FIG. 2 shows an illustrative diagram for supplemented data packets, in accordance with one or more embodiments.

FIG. 2 shows an illustrative diagram for supplemented data packets, in accordance with one or more embodiments. In some embodiments, FIG. 2 may represent generating a parallel processing stream by mirroring an incoming data stream prior to receipt by an intermediary device and supplementing each of the data packets with a respective sequence indicium corresponding to a respective time interval to generate supplemented data packets, wherein the parallel processing stream is destined for a second application implemented on a secondary device.

For example, table 200 may represent a data packet of an incoming data stream. The system may tag the data packet with additional information (e.g., supplemental information) as shown in table 200. For example, the system may tag a data packet of the incoming data stream to supplement each of the data packets with a respective sequence indicium corresponding to a respective time interval. By doing so, the system may generate supplemented data packets.

For example, the system may receive data feeds from various financial exchanges, often in the form of electronic messages. These data feeds contain information about trades, quotes, order book updates, and other relevant market data. The system may normalize and standardize the incoming data to ensure consistency. Different exchanges may have varying data formats, and normalization helps create a unified format for easier processing. The system may assign time stamps to incoming data to reflect the exact time at which each event occurred. The system may filter out irrelevant or duplicate data to reduce bandwidth usage and ensure that only essential information is distributed to subscribers.

In order to optimize data transmission and reduce latency, the system may use compression techniques to minimize the amount of data that needs to be transmitted. The system may distribute the processed and normalized data to various subscribers, including financial institutions, trading firms, market data vendors, and other entities that require real-time market information. The system may be designed to operate with low latency, ensuring that market data reaches subscribers as quickly as possible. This is crucial in high-frequency trading environments where split-second decisions can have a significant impact. The system may be built to handle large volumes of market data efficiently. As trading volumes increase, the system must be scalable to accommodate the growing demands for real-time data processing.

The process of tagging incoming data packets in a data stream with additional information may be performed using various networking protocols and mechanisms. In the context of local area networks (LANs), Ethernet frames are often used to carry data. The Ethernet frame includes a header that contains various fields, including source and destination MAC addresses. Additional information, such as Virtual Local Area Network (VLAN) tags, can be included to identify a specific virtual network segment to which the data belongs. Alternatively or additionally, the system may use Transmission Control Protocol (TCP) and User Datagram Protocol (UDP). These transport layer protocols include header fields that can be used to convey additional information. For example, TCP includes flags for control purposes, and UDP includes port numbers. Alternatively or additionally, the system may use VLAN tagging. VLAN tagging involves adding a VLAN identifier to the Ethernet frame. This allows networks to be logically segmented, and devices on different VLANs can be isolated from each other. VLAN tagging is commonly used in Ethernet switches to organize and manage traffic within a network. Alternatively or additionally, the system may use Quality of Service (QOS) Marking. QoS mechanisms enable the prioritization of network traffic. Devices can mark packets with specific QoS values in the Internet Protocol (IP) header, allowing network devices to prioritize or manage the flow of data based on these markings. Alternatively or additionally, the system may use Deep Packet Inspection (DPI). DPI involves inspecting the content of data packets at a deeper level to extract information about the payload. This method can be used for various purposes, including application identification, content filtering, and intrusion detection. Some applications or network devices may use custom headers or tags to convey application-specific information. This requires coordination between systems to ensure that both the sender and receiver understand the custom tags. Certain applications or middleware layers may include mechanisms for tagging data at a higher layer in the OSI model. This can include adding metadata to the payload of the data packet.

Table 250 may represent a data packet of the incoming data stream that corresponds to a processing action being performed by a first application. As described herein, a processing action may refer to any operation or set of operations performed on data or information. This might include tasks such as sorting, filtering, analyzing, transforming, or storing data. A processing action may be a specific operation or set of instructions carried out by a computer program. This might involve calculations, data manipulation, input/output operations, or other tasks performed by a computer. For example, a processing action may comprise an order (or other action) performed by the first application in response to ticker data (e.g., data in an incoming data stream).

The system may detect a correlation between data packets represented by table 200 and table 250 using a second application. In some embodiments, the system may use an artificial intelligence model to detect correlations. Alternatively or additionally, the system may determine that a first application was triggered by one or more data packets in the incoming data stream. The system may then use data about the various data packets in the incoming data stream (e.g., as captured in the supplemented data packets) to determine which data packet caused the trigger. The system may then determine a difference in time between the correlated data packets to determine a processing speed of the first application. For example, the system may retrieve a first data packet and a second data packet from the supplemented data packets of the parallel processing stream in response to detecting a correlation, based on a processing action performed by the first application, between a third data packet and a fourth data packet in the incoming data stream, wherein the first data packet is supplemented with a first sequence indicium, and wherein the second data packet is supplemented with a second sequence indicium.

Second application 230 may then compare the first sequence indicium to the second sequence indicium to determine a processing speed for a first application, wherein the first application is implemented on the intermediary device. For example, the system may extract the sequence indicium for both the first and second data packets. This information helps establish the order or sequence in which the packets were processed or arrived. The system may determine whether there is a correlation or relationship between the sequence indicium of the first and second data packets. This comparison is essential for understanding the sequence of events in the processing stream. If a correlation is found between content indicia and/or sequence indicia, the system may use this information to calculate the processing speed for the first application. The calculation may involve considering the time difference between the first and second data packets, as discussed in the previous response.

Figure 3A:
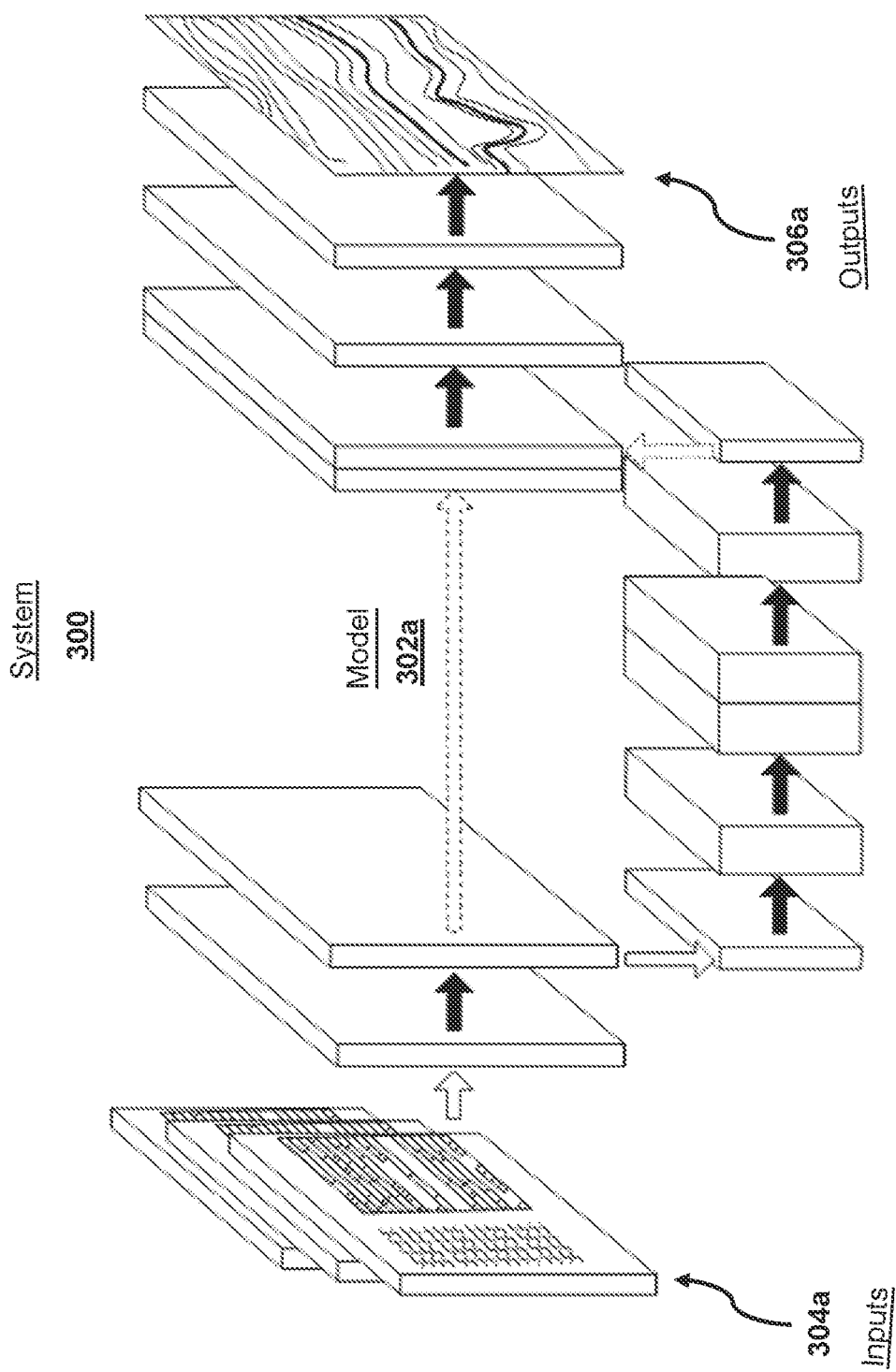
FIGS. 3A-3B show illustrative components for a system used to detect real-time delays in electronic communications, in accordance with one or more embodiments.
Figure 3B:
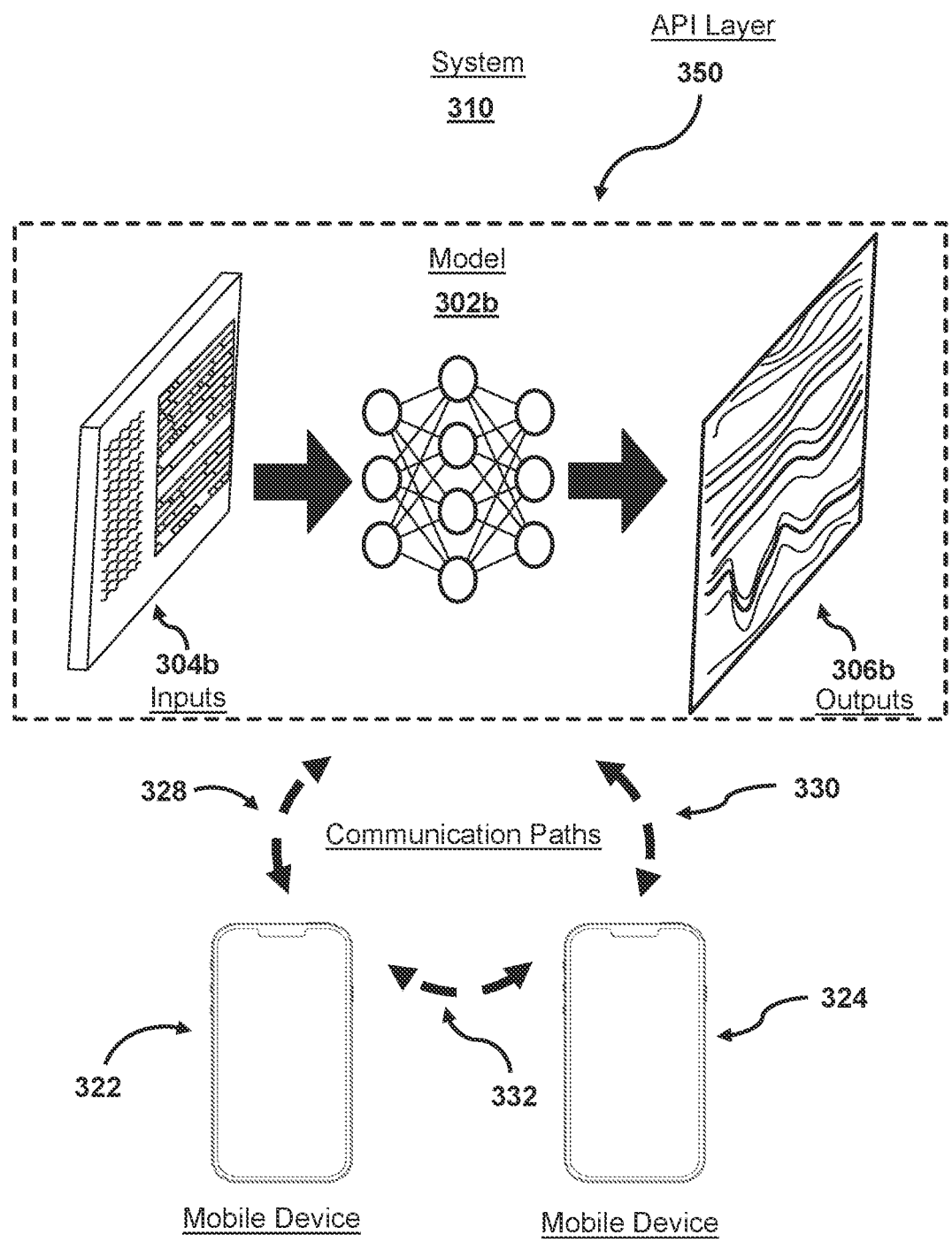

FIGS. 3A-B show illustrative components for a system used to detect real-time delays in electronic communications, in accordance with one or more embodiments. For example, FIG. 3A may represent a model architecture used to generate a parallel processing stream, generate supplemented data packets, and/or detect correlations.

System 300 also includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a parallel processing stream, a supplemented data packet, and/or detected correlations). For example, to train a model, the system may receive historical data (e.g., data related to historic parallel processing streams, supplemented data packets, and/or detected correlations). The system may use the historical data to make predictions about current data packets.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to generate a parallel processing stream, supplemented data packets, and/or detect correlations.

FIG. 3B shows illustrative components for a system used to generate a parallel processing stream, supplemented data packets, and/or detect correlations, in accordance with one or more embodiments. For example, FIG. 3B may show illustrative components for to generating a parallel processing stream, supplemented data packets, and/or detect correlations. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device, (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more cloud components. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a parallel processing stream, supplemented data packets, and/or correlations).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
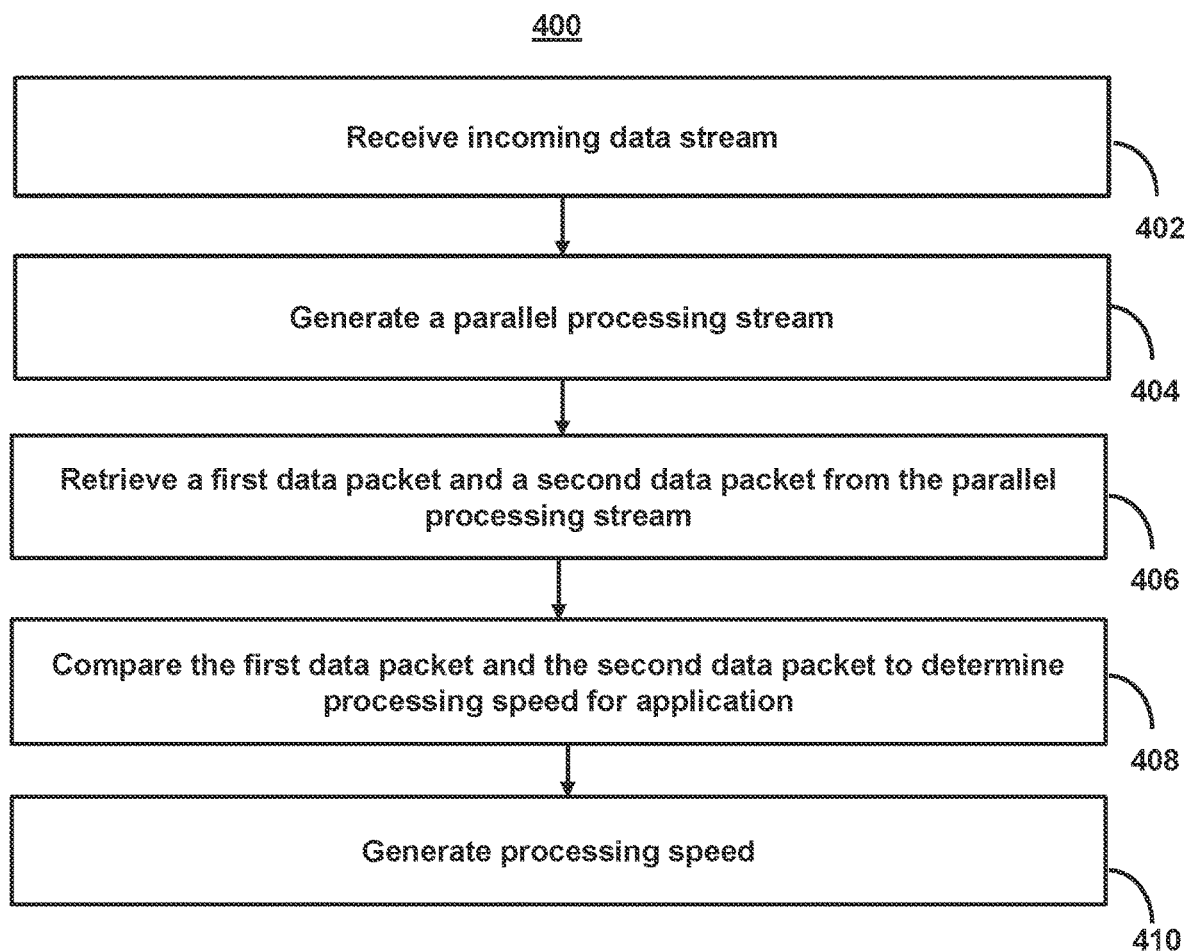
FIG. 4 shows a flowchart of the steps involved in detecting real-time delays in electronic communications, in accordance with one or more embodiments.

FIG. 4 shows a flowchart of the steps involved in detecting real-time delays in electronic communications, in accordance with one or more embodiments. For example, the system may use process 400 (e.g., as implemented on one or more system components described above) in order to detect real-time delays in electronic communications over computer networks, using parallel processing streams, in an ongoing manner and with limited access to intermediary devices.

At step 402, process 400 (e.g., using one or more components described above) receives an incoming data stream. For example, the system may receive an incoming data stream, wherein the incoming data stream is destined for an intermediary device, and wherein the incoming data stream comprises time-series data comprising data packets at discrete time intervals.

At step 404, process 400 (e.g., using one or more components described above) generates a parallel processing stream. For example, the system may generate a parallel processing stream by mirroring the incoming data stream prior to receipt by the intermediary device and supplementing each of the data packets with a respective sequence indicium corresponding to a respective time interval to generate supplemented data packets.

In some embodiments, generating the parallel processing stream may comprise supplementing each of the data packets with a time stamp corresponding to a respective time stamp to generate the supplemented data packets. For example, the system may add a time stamp to data packets in a data stream to provide a reference for when the data was generated or captured. In such cases, time stamp information can be included in the headers of data packets at various protocol layers. For example, the IP header may include a time stamp field. In some embodiments, the system may support hardware-based time stamping. This involves the use of specialized hardware components to add precise time stamps to incoming or outgoing data packets.

In some embodiments, generating the parallel processing stream may comprise the system supplementing each of the data packets with a content indicium corresponding to a respective content to generate the supplemented data packets. For example, the process of adding a content indicium (a marker or identifier) corresponding to a respective content to supplemented data packets in a data stream involves embedding information within the packets to uniquely identify or categorize the content. This can be useful in various scenarios, such as content-based routing, QoS prioritization, or application-specific processing. To do so, the system may define a format or structure for the content indicium. This could be a specific field in the packet header or payload that carries the information needed to identify the content. Depending on the chosen format, the system may need to modify the data packets by adding the content indicium. This modification can occur at different layers of the network stack, such as the application layer, transport layer, or even within the data payload. If the content indicium is added within the payload, the system can embed information directly into the data being transmitted. This requires coordination between the sender and receiver to ensure that both parties understand the format of the content indicium. Some embodiments may opt to use custom headers or tags within the packet to carry the content indicium. These headers or tags are added to the standard packet structure and can be specifically designed to carry additional metadata, including content identifiers. In some embodiments, a content indicium can be added or processed at the application layer. For example, a streaming application might include metadata within the payload that indicates the type or category of content being transmitted.

In some embodiments, generating the parallel processing stream may comprise supplementing each of the data packets with a type indicium corresponding to a respective type to generate the supplemented data packets. For example, to generate a parallel processing stream by supplementing each data packet with a type indicium corresponding to a respective type, the system needs to include additional metadata within the packets. This metadata, represented by the type indicium, helps identify the type of data or content carried by each packet. The system may establish a format or structure for the type indicium. This format should be agreed upon and well defined, ensuring that both the sending and receiving components understand how to interpret the type information. The system may modify each data packet to include the type indicium. This modification can occur at different layers of the network stack, depending on the specific requirements and use case. Common locations include the packet header or payload. If using the payload for the type indicium, the system embeds information directly into the data being transmitted. This information may include a numerical code, a string, or any other identifier that signifies the type of content. The system may use custom headers or tags within the packet structure to carry the type indicium. These headers or tags can be specifically designed to carry additional metadata, including the type information. The system may process or add the type indicium at the application layer. This could involve modifying the payload or adding specific metadata to the packet. The type information is typically determined based on the characteristics of the content. The system may use the type indicium to ensure coordination (and/or detect correlations) between the sender and receiver systems to understand and agree on the type indicium format. This coordination is crucial for proper interpretation of the type information at the receiving end.

In some embodiments, the type indicium can be used by parallel processing components to route packets to specific processing units or threads based on the type of content. For example, packets with a certain type may be processed by one set of parallel processors, while packets with a different type may be processed by another set. If the system operates within a specific network protocol (e.g., TCP, UDP), the system may ensure that any modifications to packet headers or payload comply with the rules and specifications of that protocol.

In some embodiments, the system may have multiple market streams and determine a respective identifier for each. In such cases, the system may retrieve a plurality of incoming data streams. The system may sort the plurality of incoming data streams. For example, generating the parallel processing stream by mirroring the incoming data stream prior to receipt by the intermediary device and supplementing each of the data packets with a respective sequence indicium corresponding to the respective time interval to generate supplemented data packets may comprise the system determining a data stream identifier for the incoming data stream and retrieving a sequence indicia modeler, from a plurality of sequence indicia modelers, for determining the respective sequence indicium based on the data stream identifier. For example, the system may determine the incoming data stream that needs to be mirrored and processed in parallel. This could be a network data stream, a data feed from sensors, or any other source of streaming data. The system may establish a method for determining a unique data stream identifier for the incoming data stream. This identifier helps distinguish different data streams, especially if there are multiple streams being processed in parallel. The system may set up a mechanism to mirror the incoming data stream. This involves creating a duplicate or mirror of the original data stream before it reaches the intermediary device. The system may develop or select a plurality of sequence indicium modelers. Each modeler should be capable of determining a sequence indicium based on the characteristics or properties of the incoming data stream. The choice of modeler can depend on the nature of the data and the desired method of sequencing. The system may use the data stream identifier to determine which sequence indicium modeler to apply to the incoming data stream. The mapping between data stream identifiers and sequence indicium modelers allows for customized processing based on the characteristics of each data stream. Based on the determined sequence indicium modeler, the system may apply the modeler to the mirrored data stream. The modeler analyzes the characteristics of the data stream to generate a sequence indicium for each data packet. The sequence indicium should correspond to the respective time interval or other relevant criteria. For each data packet in the mirrored data stream, the system may supplement it with the determined sequence indicium. This involves adding metadata to each packet that uniquely identifies its position or sequence within the data stream. The result is a parallel processing stream composed of supplemented data packets, each containing the original data and a sequence indicium. These supplemented data packets are ready for parallel processing.

At step 406, process 400 (e.g., using one or more components described above) retrieves a first data packet and a second data packet from the parallel processing stream. For example, the system may retrieve a first data packet and a second data packet from the supplemented data packets of the parallel processing stream, wherein the first data packet is supplemented with a first sequence indicium, and wherein the second data packet is supplemented with a second sequence indicium.

In some embodiments, the system may retrieve the first data packet and the second data packet from the supplemented data packets of the parallel processing stream by retrieving a first content indicium for the first data packet and retrieving a second content indicium for the second data packet. The system may determine a first correlation between the first content indicium and the second content indicium and determine to compare the first sequence indicium to the second sequence indicium to determine the processing speed for the first application based on the first correlation. For example, the data packets in the parallel processing stream are supplemented with additional metadata, such as content indicia and sequence indicia. Content indicium helps identify the type or nature of the content in each packet, while sequence indicium indicates the order or sequence of the packets. The system may retrieve the first and second data packets from the parallel processing stream. This retrieval may involve monitoring the stream and identifying packets based on their sequence numbers or other relevant indicators. The system may extract the content indicium for both the first and second data packets. This information helps identify the type or category of content within each packet. The system may compare the content indicium of the first data packet with that of the second data packet to determine a correlation between them. This correlation can be a measure of similarity, relevance, or any relationship defined by the system. For example, where two feeds have the same sequence number, the system may use extra info (e.g., a feed, trade, price, etc. identifier) to distinguish.

In some embodiments, retrieving the first data packet and the second data packet from the supplemented data packets of the parallel processing stream may comprise the system retrieving a first type indicium for the first data packet. The system may then retrieve a second type indicium for the second data packet. The system may determine a second correlation between the first type indicium and the second type indicium. The system may then determine to compare the first sequence indicium to the second sequence indicium to determine the processing speed for the first application based on the second correlation. For example, the system may correlate the same type of message (e.g., "atomic flush" to a "NewOrder", "Canceled," etc.).

In some embodiments, retrieving the first data packet and the second data packet from the supplemented data packets of the parallel processing stream may comprise the system inputting the parallel processing stream into an artificial intelligence model, wherein the artificial intelligence model is trained on historic time-series data to determine correlations between the historic time-series data. The system may receive from the artificial intelligence model a first output, wherein the first output indicates a correlation between the first data packet and the second data packet. The system may determine to retrieve the first data packet and the second data packet based on the first output.

At step 408, process 400 (e.g., using one or more components described above) compares the first data packet and the second data packet to determine processing speed for an application. For example, the system may compare the first sequence indicium to the second sequence indicium to determine a processing speed for a first application, wherein the first application is implemented on the intermediary device.

In some embodiments, the system may compare the first sequence indicium to the second sequence indicium to determine the processing speed for the first application. For example, based on comparing the first sequence indicium to the second sequence indicium, the system may retrieve a first time stamp for the first data packet and a second time stamp for the second data packet. The system may determine a difference between the first time stamp and the second time stamp. The system may then determine the processing speed for the first application based on the difference. For example, each data packet may be time stamped when it is generated or enters the system. This time stamp reflects the time at which the packet was created or received. The time stamp can be added to the packet as part of its metadata, such as in the packet header or payload. When the first data packet is generated or received, the system may record its time stamp. Similarly, when the second data packet is generated or received, the system may record its time stamp. These time stamps capture the arrival or creation times of the respective packets. The system may subtract the time stamp of the first data packet from the time stamp of the second data packet. This calculation results in the time difference between the two packets. Once the system has the time difference, the system can use it to calculate the processing speed for the first application. The processing speed is essentially the rate at which the application processes data.

In some embodiments, the system may compare the first sequence indicium to the second sequence indicium to determine the processing speed for the first application. For example, the system may retrieve a first content indicium for the first data packet. The system may retrieve a second content indicium for the second data packet. The system may verify that the first sequence indicium corresponds to the first data packet based on the first content indicium. The system may verify that the second sequence indicium corresponds to the second data packet based on the second content indicium. For example, the system may extract the sequence indicium for both the first and second data packets. This information helps establish the order or sequence in which the packets were processed or arrived. The system may verify that the first sequence indicium corresponds to the first data packet based on the first content indicium. The system may ensure that the content indicium of the first packet matches the expected type, and the sequence indicium aligns with the expected sequence order. Similarly, the system may verify that the second sequence indicium corresponds to the second data packet based on the second content indicium. The system may ensure that the content indicium of the second packet matches the expected type, and the sequence indicium aligns with the expected sequence order. If both sequence indicia verifications pass, the system may calculate the processing speed for the first application. The system may consider the time difference between the first and second data packets, as discussed in previous responses.

At step 410, process 400 (e.g., using one or more components described above) generates processing speed. For example, the system may generate for display, on a user interface, the processing speed for the first application. For example, the system may determine, by a second application residing on a remote device, to retrieve the first data packet and the second data packet from the supplemented data packets of the parallel processing stream. The system may determine, by the second application, a time interval between the first data packet and the second data packet. The system may determine the processing speed for the first application based on the time interval.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for detecting real-time delays in electronic communications over computer networks, using parallel processing streams, in an ongoing manner and with limited access to intermediary devices.

2. The method of any one of the preceding embodiments, further comprising: receiving an incoming data stream, wherein the incoming data stream is destined for an intermediary device, and wherein the incoming data stream comprises time-series data comprising data packets at discrete time intervals; generating a parallel processing stream by mirroring the incoming data stream prior to receipt by the intermediary device and supplementing each of the data packets with a respective sequence indicium corresponding to a respective time interval to generate supplemented data packets; retrieving a first data packet and a second data packet from the supplemented data packets of the parallel processing stream, wherein the first data packet is supplemented with a first sequence indicium, and wherein the second data packet is supplemented with a second sequence indicium; comparing the first sequence indicium to the second sequence indicium to determine a processing speed for a first application, wherein the first application is implemented on the intermediary device; and generating for display, on a user interface, the processing speed for the first application.

3. The method of any one of the preceding embodiments, wherein generating the parallel processing stream further comprises supplementing each of the data packets with a time stamp corresponding to a respective time stamp to generate the supplemented data packets.

4. The method of any one of the preceding embodiments, wherein comparing the first sequence indicium to the second sequence indicium to determine the processing speed for the first application further comprises: based on comparing the first sequence indicium to the second sequence indicium, retrieving a first time stamp for the first data packet and a second time stamp for the second data packet; determining a difference between the first time stamp and the second time stamp; and determining the processing speed for the first application based on the difference.

5. The method of any one of the preceding embodiments, wherein generating the parallel processing stream further comprises supplementing each of the data packets with a content indicium corresponding to a respective content to generate the supplemented data packets.

6. The method of any one of the preceding embodiments, wherein retrieving the first data packet and the second data packet from the supplemented data packets of the parallel processing stream further comprises: retrieving a first content indicium for the first data packet; retrieving a second content indicium for the second data packet; determining a first correlation between the first content indicium and the second content indicium; and determining to compare the first sequence indicium to the second sequence indicium to determine the processing speed for the first application based on the first correlation.

7. The method of any one of the preceding embodiments, wherein comparing the first sequence indicium to the second sequence indicium to determine the processing speed for the first application further comprises: retrieving a first content indicium for the first data packet; retrieving a second content indicium for the second data packet; verifying that the first sequence indicium corresponds to the first data packet based on the first content indicium; and verifying that the second sequence indicium corresponds to the second data packet based on the second content indicium.

8. The method of any one of the preceding embodiments, wherein generating the parallel processing stream further comprises supplementing each of the data packets with a type indicium corresponding to a respective type to generate the supplemented data packets.

9. The method of any one of the preceding embodiments, wherein retrieving the first data packet and the second data packet from the supplemented data packets of the parallel processing stream further comprises: retrieving a first type indicium for the first data packet; retrieving a second type indicium for the second data packet; determining a second correlation between the first type indicium and the second type indicium; and determining to compare the first sequence indicium to the second sequence indicium to determine the processing speed for the first application based on the second correlation.

10. The method of any one of the preceding embodiments, wherein generating the parallel processing stream by mirroring the incoming data stream prior to receipt by the intermediary device and supplementing each of the data packets with a respective sequence indicium corresponding to the respective time interval to generate supplemented data packets further comprises: determining a data stream identifier for the incoming data stream; and retrieving a sequence indicia modeler, from a plurality of sequence indicia modelers, for determining the respective sequence indicium based on the data stream identifier.

11. The method of any one of the preceding embodiments, wherein receiving the incoming data stream further comprises: retrieving a plurality of incoming data streams; and sorting the plurality of incoming data streams.

12. The method of any one of the preceding embodiments, wherein mirroring the incoming data stream further comprises: determining a first network port for the intermediary device; and determining a second network port corresponding to the parallel processing stream.

13. The method of any one of the preceding embodiments, wherein mirroring the incoming data stream further comprises: determining a first network port for the intermediary device; intercepting each of the data packets at the first network port; and duplicating each of the data packets at the first network port in real time.

14. The method of any one of the preceding embodiments, wherein retrieving the first data packet and the second data packet from the supplemented data packets of the parallel processing stream further comprises: inputting the parallel processing stream into an artificial intelligence model, wherein the artificial intelligence model is trained on historic time-series data to determine correlations between the historic time-series data; receiving from the artificial intelligence model a first output, wherein the first output indicates a correlation between the first data packet and the second data packet; and determining to retrieve the first data packet and the second data packet based on the first output.

15. The method of any one of the preceding embodiments, wherein comparing the first sequence indicium to the second sequence indicium to determine the processing speed for the first application further comprises: determining, by a second application residing on a remote device, to retrieve the first data packet and the second data packet from the supplemented data packets of the parallel processing stream; and determining, by the second application, a time interval between the first data packet and the second data packet; and determining the processing speed for the first application based on the time interval.

16. A tangible, non-transitory, computer-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A method for detecting real-time delays in electronic communications over computer networks, using parallel processing streams, in an ongoing manner and with limited access to intermediary devices, the method comprising:
   receiving an incoming data stream, wherein the incoming data stream is destined for an intermediary device, wherein the incoming data stream comprises time-series data comprising data packets at discrete time intervals, and wherein a first application implemented on the intermediary device performs one or more processing actions based on information detected in the data packets;
   generating a parallel processing stream by mirroring the incoming data stream prior to receipt by the intermediary device and supplementing each of the data packets with a respective sequence indicium corresponding to a respective time interval to generate supplemented data packets, wherein the parallel processing stream is destined for a second application implemented on a secondary device;
   retrieving a first data packet and a second data packet from the supplemented data packets of the parallel processing stream, wherein the first data packet is supplemented with a first sequence indicium, and wherein the second data packet is supplemented with a second sequence indicium;
   comparing the first sequence indicium to the second sequence indicium to determine a processing speed for a first application; and
   generating for display, on a user interface, the processing speed for the first application.

2. The method of claim 1, wherein generating the parallel processing stream further comprises supplementing each of the data packets with a time stamp corresponding to a respective time stamp to generate the supplemented data packets.

3. The method of claim 2, wherein comparing the first sequence indicium to the second sequence indicium to determine the processing speed for the first application further comprises:

based on comparing the first sequence indicium to the second sequence indicium, retrieving a first time stamp for the first data packet and a second time stamp for the second data packet;
determining a difference between the first time stamp and the second time stamp; and
determining the processing speed for the first application based on the difference.

4. The method of claim 1, wherein generating the parallel processing stream further comprises supplementing each of the data packets with a content indicium corresponding to a respective content to generate the supplemented data packets.

5. The method of claim 4, wherein retrieving the first data packet and the second data packet from the supplemented data packets of the parallel processing stream further comprises:
retrieving a first content indicium for the first data packet;
retrieving a second content indicium for the second data packet;
determining a first correlation between the first content indicium and the second content indicium; and
determining to compare the first sequence indicium to the second sequence indicium to determine the processing speed for the first application based on the first correlation.

6. The method of claim 4, wherein comparing the first sequence indicium to the second sequence indicium to determine the processing speed for the first application further comprises:
retrieving a first content indicium for the first data packet;
retrieving a second content indicium for the second data packet;
verifying that the first sequence indicium corresponds to the first data packet based on the first content indicium; and
verifying that the second sequence indicium corresponds to the second data packet based on the second content indicium.

7. The method of claim 1, wherein generating the parallel processing stream further comprises supplementing each of the data packets with a type indicium corresponding to a respective type to generate the supplemented data packets.

8. The method of claim 6, wherein retrieving the first data packet and the second data packet from the supplemented data packets of the parallel processing stream further comprises:
retrieving a first type indicium for the first data packet;
retrieving a second type indicium for the second data packet;
determining a second correlation between the first type indicium and the second type indicium; and
determining to compare the first sequence indicium to the second sequence indicium to determine the processing speed for the first application based on the second correlation.

9. The method of claim 1, wherein generating the parallel processing stream by mirroring the incoming data stream prior to receipt by the intermediary device and supplementing each of the data packets with a respective sequence indicium corresponding to the respective time interval to generate supplemented data packets further comprises:
determining a data stream identifier for the incoming data stream; and
retrieving a sequence indicia modeler, from a plurality of sequence indicia modelers, for determining the respective sequence indicium based on the data stream identifier.

10. The method of claim 1, wherein receiving the incoming data stream further comprises:
retrieving a plurality of incoming data streams; and
sorting the plurality of incoming data streams.

11. The method of claim 1, wherein mirroring the incoming data stream further comprises:
determining a first network port for the intermediary device; and
determining a second network port corresponding to the parallel processing stream.

12. The method of claim 1, wherein mirroring the incoming data stream further comprises:
determining a first network port for the intermediary device;
intercepting each of the data packets at the first network port; and
duplicating each of the data packets at the first network port in real time.

13. The method of claim 1, wherein retrieving the first data packet and the second data packet from the supplemented data packets of the parallel processing stream further comprises:
inputting the parallel processing stream into an artificial intelligence model, wherein the artificial intelligence model is trained on historic time-series data to determine correlations between the historic time-series data;
receiving from the artificial intelligence model a first output, wherein the first output indicates a correlation between the first data packet and the second data packet; and
determining to retrieve the first data packet and the second data packet based on the first output.

14. The method of claim 1, wherein comparing the first sequence indicium to the second sequence indicium to determine the processing speed for the first application further comprises:
determining, by a second application residing on a remote device, to retrieve the first data packet and the second data packet from the supplemented data packets of the parallel processing stream;
determining, by the second application, a time interval between the first data packet and the second data packet; and
determining the processing speed for the first application based on the time interval.

15. A system for detecting real-time delays in electronic communications over computer networks, using parallel processing streams, in an ongoing manner and with limited access to intermediary devices, the system comprising:
one or more processors; and
one or more non-transitory, computer readable mediums comprising instructions that when executed by the one or more processors cause operations comprising:
receiving an incoming data stream, wherein the incoming data stream is destined for a first application implemented on an intermediary device, and wherein the incoming data stream comprises time-series data comprising data packets at discrete time intervals, and wherein the first application performs one or more processing actions based on information detected in the data packets;
generating a parallel processing stream by mirroring the incoming data stream prior to receipt by the intermediary device and supplementing each of the data packets with a respective sequence indicium corresponding to a respective time interval to generate supplemented data packets, wherein the parallel processing stream is destined for a second application implemented on a secondary device;

retrieving, by the second application, a first data packet and a second data packet from the supplemented data packets of the parallel processing stream in response to detecting a correlation, based on a processing action performed by the first application, between a third data packet and a fourth data packet in the incoming data stream, wherein the first data packet is supplemented with a first sequence indicium, and wherein the second data packet is supplemented with a second sequence indicium;

comparing, by the second application, the first sequence indicium to the second sequence indicium to determine a processing speed for a first application, wherein the first application is implemented on the intermediary device; and generating for display, on a user interface, the processing speed for the first application.

16. One or more non-transitory, computer readable mediums comprising instructions that, when executed by one or more processors, cause operations comprising:

receiving an incoming data stream, wherein the incoming data stream is destined for an intermediary device, wherein the incoming data stream comprises time-series data comprising data packets at discrete time intervals, and wherein a first application implemented on the intermediary device performs one or more processing actions based on information detected in the data packets;

generating a parallel processing stream by mirroring the incoming data stream prior to receipt by the intermediary device and supplementing each of the data packets with a respective sequence indicium corresponding to a respective time interval to generate supplemented data packets, wherein the parallel processing stream is destined for a second application implemented on a secondary device;

retrieving a first data packet and a second data packet from the supplemented data packets of the parallel processing stream, wherein the first data packet is supplemented with a first sequence indicium, and wherein the second data packet is supplemented with a second sequence indicium; and comparing the first sequence indicium to the second sequence indicium to determine a processing speed for the first application.

17. The one or more non-transitory, computer readable mediums of claim 16, wherein generating the parallel processing stream further comprises supplementing each of the data packets with a time stamp corresponding to a respective time stamp to generate the supplemented data packets.

18. The one or more non-transitory, computer readable mediums of claim 17, wherein comparing the first sequence indicium to the second sequence indicium to determine the processing speed for the first application further comprises:

based on comparing the first sequence indicium to the second sequence indicium, retrieving a first time stamp for the first data packet and a second time stamp for the second data packet;

determining a difference between the first time stamp and the second time stamp; and determining the processing speed for the first application based on the difference.

19. The one or more non-transitory, computer readable mediums of claim 16, wherein generating the parallel processing stream further comprises supplementing each of the data packets with a content indicium corresponding to a respective content to generate the supplemented data packets.

20. The one or more non-transitory, computer readable mediums of claim 19, wherein retrieving the first data packet and the second data packet from the supplemented data packets of the parallel processing stream further comprises:

retrieving a first content indicium for the first data packet;

retrieving a second content indicium for the second data packet;

determining a first correlation between the first content indicium and the second content indicium; and determining to compare the first sequence indicium to the second sequence indicium to determine the processing speed for the first application based on the first correlation.

* * * * *